Figure 1:
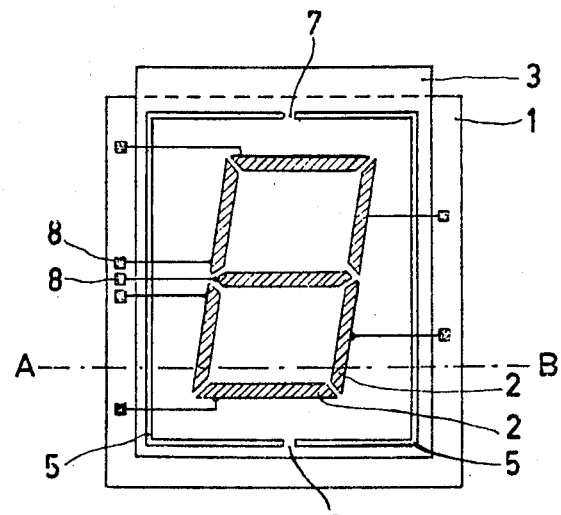

United States Patent van der Veen et al.

[11] 3,907,768
[45] Sept. 23, 1975

[54] LIQUID CRYSTALLINE AZOXYBENZENE COMPOUNDS

[75] Inventors: Jan van der Veen; Adrianus Hendrikus Grobben, both of Eindhoven, Netherlands

[73] Assignee: U.S. Philips Corporation, New York, N.Y.

[22] Filed: Mar. 31, 1972

[21] Appl. No.: 240,171

[30] Foreign Application Priority Data
Apr. 3, 1971 Netherlands................. 7104498

[52] U.S. Cl.............. 260/143; 260/205; 260/562 R; 260/578; 260/592; 252/408; 350/160 R
[51] Int. Cl.² ........................................ C07C 105/00
[58] Field of Search ................................. 260/143

[56] References Cited
UNITED STATES PATENTS 3,467,688  9/1969  Putnam et al.............. 260/143 X
3,532,642  10/1970  Furukawa et al............ 260/143 X

OTHER PUBLICATIONS

Newbold et al., Chemical Abstracts, Volume 60, 11922f (1964).
Ruechardt et al., Chemical Abstracts, Volume 57, 16474d (1962).
Ber. Deut. Chem. Gesll., Du Toit Malherbe, Volume 52, pages 319 to 324 (1919).
Houben-Weyl, "Methodischen Der Organischen Chemie," Volume 10/3, pages 762 to 767 (1965).

*Primary Examiner*—Floyd D. Higel
*Attorney, Agent, or Firm*—Frank R. Trifari; Norman N. Spain

[57] ABSTRACT

Novel p, p'-di-n-alkyl azoxybenzenes containing 4 to 10 carbons in the alkyl groups have been found to be liquid crystalline having transition temperatures above their melting points.

9 Claims, 2 Drawing Figures

LIQUID CRYSTALLINE AZOXYBENZENE COMPOUNDS

The invention relates to novel liquid crystalline azoxy compounds.

Several azoxy benzene compounds which are substituted by a polar group in both para positions and have liquid crystalline properties have been described, for example p,p'-dimethoxyazoxybenzene and p,p'-dihexyloxyazoxybenzene (for example in J. Org. Chem. 33 591–597 (1968)). Hitherto it has been assumed that the presence of polar substituents is a condition for liquid crystalline properties (G. W. Gray, Molecular Structure and Properties of Liquid Crystals, London/-New York (1962) page 184).

It has indeed been found that azoxybenzenes substituted by apolar groups, such as p,p'-dimethylazoxybenzene and p,p'-diethylazoxybenzene, are not liquid crystalline.

Surprisingly the novel p,p'-di-n.alkylazoxybenzenes in which the alkyl groups contain from 3 to 10 carbon atoms have been found to be liquid crystalline. Although these compounds themselves do not exhibit "dynamic scattering" in a static or alternating electric field, it was found that mixtures of the novel azoxybenzenes with liquid crystalline azomethines, such as those described in French Pat. specification No. 1,537,000, Dutch Pat. application No. 7,007,012, German Prepublished Pat. application Nos. 1,928,242, 2,017,727 and 2,038,780, do exhibit dynamic scattering. Moreover the admixture of azomethines increases the temperature range within which the azoxybenzenes are liquid crystalline.

Accordingly the invention relates to novel azoxybenzene compounds of formula 1

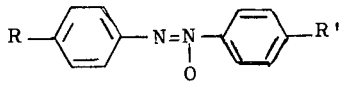

where R and R' each represent a n-alkylgroup containing from 3 to 10 carbon atoms, to mixtures of the compounds and to mixtures with liquid crystalline azomethines.

It should be noted that, as described in Mikrochemie, Mikrochimica Acta 38 376–380 (1951), p,p'-dimethyldiazoxybenzene is alleged to be crystalline between 69.8°C and the melting point 70°C. Apart from the fact that a compound which is liquid crystalline within a range of 0.2°C would be unsuitable for use in practice, a liquid crystalline nature is erroneously ascribed to the said compound. It is asserted that "liquid crystalline" regions were observed on slow cooling of the melt. Probably, however, the formation of very small crystals gave rise to this erroneous interpretation. If in a preparation of homogeneous composition and homogeneous temperature distribution, such as a slowly cooled melt, liquid crystalline phenomena occur, they extend through the entire preparation and are not restricted to small regions.

The compounds according to the invention are partly nematic and partly smectic. Some have both a smectic and a nematic range.

In Table 1 compounds according to the invention and their liquid crystalline properties are listed.

TABLE 1

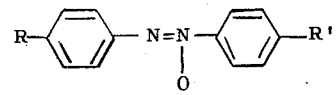

| R | R' | M.P., °C | N/I °C | S/N °C | S/I °C |
|---|---|---|---|---|---|
| $C_3H_7$ | $C_3H_7$ | 65 – 66 | 60 | | |
| $C_4H_9$ | $C_4H_9$ | 18 | 27 | | |
| $C_5H_{11}$ | $C_5H_{11}$ | 21 – 22 | 71.5–72 | | |
| $C_6H_{13}$ | $C_6H_{13}$ | 20 – 21 | 47.5–48 | | |
| $C_7H_{15}$ | $C_7H_{15}$ | 33 – 34.5 | 70 –71 | 55 | |
| $C_8H_{17}$ | $C_8H_{17}$ | 38 – 39.5 | 67 | 66 | |
| $C_9H_{19}$ | $C_9H_{19}$ | 45 – 45.5 | | | 77.5 |
| $C_{10}H_{21}$ | $C_{10}H_{21}$ | 50.5–51.5 | | | 77.5 |

N/I : transition temperature nematic-isotropic
S/N : transition temperature smectic-nematic
S/I : transition temperature smectic-isotropic.

The nematic liquid crystalline temperature range of p,p'-di-n.butylazoxybenzene (18°–27°C) is increased to from 5° to 10°C – 42°C by the admixture of 0.4 mole of 4'-methoxybenzylidene-4-butyloxyaniline.

On admixture of 1 mole of 4'-ethoxybenzylidene-4-n.butylaniline the liquid crystalline range of the substance extends from −3°C to +45°C.

Table 2 gives some mixtures of compounds of the formula 1.

TABLE 2

| substance A R, R' | substance B R, R' | substance C R, R' | Ratio A/B/C | M.P., °C | N/I °C | S/N °C |
|---|---|---|---|---|---|---|
| $C_4H_9$ | $C_3H_7$ | | 2 moles/ 1 mole | 3.5–4.5 | 33 | |
| $C_4H_9$ | $C_5H_{11}$ | | 10 parts by weight 90 parts by weight | 16 | 58 | |
| $C_5H_{11}$ | $C_6H_{13}$ | | 1 mole/ 1 mole | 9 | 55 | |
| $C_5H_{11}$ | $C_6H_{13}$ | | 3 moles/ 1 mole | 8 | 57 | |
| $C_5H_{11}$ | $C_6H_{13}$ | | 1 mole/ 3 moles | 12 | 53 | |
| $C_4H_9$ | $C_5H_{11}$ | $C_6H_{13}$ | 1 mole/ 1 mole/ 1 mole | −2 – +2 | 52 | |
| $C_4H_9$ | $C_8H_{17}$ | | 2 moles/ 1 mole | 5 – 10 | 38–39 | 13 |
| $C_4H_9$ | $C_7H_{15}$ | | 1 mole/ 1 mole | 2 – 6 | 48–49 | 5 |
| $C_4H_9/C_5H_{11}$ | 4-components, Example 4. | | | −8 – +2 | 41–42 | |

Compounds and mixtures according to the invention may be used in E.S.R. (electron spin resonance) and N.M.R. (nuclear magnetic resonance) measurements, in gas chromatography and in displays.

The novel azoxybenzene compounds may be produced by methods known for the production of compounds of this type and by analogous methods.

A suitable method is that in which a compound of the formula 2

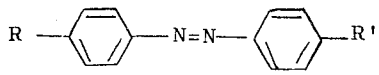

where R and R' have the same meanings as in formula 1, is oxidized. The reaction is preferably carried out with hydrogen peroxide. The solvent used preferably is glacial acetic acid.

The compound of the formula 2 are obtainable by acetylating n.alkylbenzene with acetylchloride or acetic acid anhydride, using $AlCl_3$ as a catalyst. The p-n.alkylacetophenones obtained are then converted in a Schmidth reaction with sodium azide into p-n. alkylacetanilides, which subsequently are hydrolysed. The resulting p-n.alkylanilines or mixtures of p-alkylanilines may then be oxidized with active $MnO_2$ to form the compounds of the formula 2.

The compounds of the formula 1 are also obtainable by oxidizing p-n-alkylanilines of the formula 3

or mixtures of p-n-alkylanilines. This reaction is preferably carried out with hydrogen peroxide, for example with acetonitrile as a co-oxidant.

Figure 2:
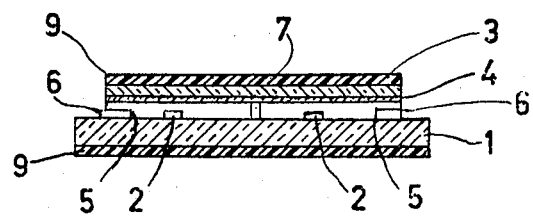

FIG. 1 is a plan view of the display before the polarization screens are applied, FIG. 2 is a cross-sectional view taken on the line A–B after that the polarization screens have been applied.

EXAMPLES 1a. p-n.propylacetophenone 42.6 ml of acetylchloride was added drop by drop with vigorous stirring to a suspension of 80 g of of aluminium chloride in 350 ml of carbon tetrachloride, care being taken to ensure that the temperature of the solution did not exceed 5°C. Subsequently under the same conditions 60 g of n-propylbenzene was added drop by drop over a period of 3 hours, after which stirring was continued for 1 hour. The reaction mixture was poured in a mixture of 500 g of ice and 250 ml of concentrated hydrochloric acid. The organic layer was separated and successively agitated twice with 250 ml of 2N hydrochloric acid, once with 250 ml of a saturated sodium carbonate solution and once with 250 ml of water. After drying for 3 hours on a molecular sieve of mesh width 4 A the carbon tetrachloride was distilled off and the residue was distilled under reduced pressure. Boiling point 82°–90°C (0.9–1.0 mm of Hg).

1b. p-n.propylacetanilide 7 g of sodium azide was added with vigorous stirring to a solution of 16.2 g of p-n.propylacetophenone in 146 ml of 70% $H_2SO_4$ in an hour at a temperature of from 15° to 20°C. 50 ml of methylenechloride was added to prevent foaming. The mixture was stirred for half an hour. Then the reaction mixture was poured in 200 ml of ice water and 100 ml of methylene chloride. The aqueous layer was separated and extracted twice with 50 ml portions of methylene chloride. The collected methylene chloride extracts were agitated with 50 ml of a saturated sodium carbonate solution and 50 ml of water. 150 ml of methylene chloride was distilled off and the residual solution was poured in 200 ml of petroleum ether (boiling point 60° – 80°C). The resulting residue was filtered off and dried under reduced temperature.

Melting point 98.5° – 99.5°C.

1c. p-n.propylaniline

A mixture of 58 g of p-n-propylacetanilide, 552 ml of ethanol, 275 ml of sodiumhydroxide and 172 ml of water was boiled at a reflux cooler for 5½ hours. The ethanol was then distilled off until the bottom temperature was 94°C. The residue was poured in a mixture of 600 g of ice and 400 ml of water. This liquid was extracted with 400 ml of benzene and twice with 200 ml portions of benzene. The benzene extracts were washed twice with portions of 200 ml water and then dried over potassium carbonate. The benzene was then distilled off and the residue was distilled under reduced pressure.

Boiling point 60° – 62°C (0.5 – 0.55 mm of Hg).

1d. p,p'-di-n.propylazoxybenzene

A mixture of 20.5 g of acetonitrile, 200 ml of methanol and 12.4 g of p.n.propylaniline was heated to from 35° to 40°C and the pH-value was brought to 9.5 by the addition of 2 N sodium hydroxide. This temperature and pH-value were carefully maintained during the entire reaction. Then 68 ml of a 30 % hydrogen peroxide solution was added with vigorous stirring in an hour. Subsequently stirring was continued for 5 hours. After the mixture had been allowed to stand for a comparatively short time the above-mentioned liquid was decanted and the residual oil was subjected to steam distillation. The residue of the steam distillation was recrystallized from methanol-ethanol (1 : 1).

Melting point 65° – 66°C

2. The compounds listed in Table 2 were prepared by analogous methods, 3a. p,p'-di-n.-butylazobenzene A mixture of 7.45 g of p-n.butylaniline, 26 g of manganese dioxide and 250 ml of benzene was boiled at a reflux cooler with vigorous stirring for 6 hours, the water being removed azeotropically. Subsequently the manganese dioxide was filtered off and the benzene was distilled off. The residue was recrystallized from ethanol.

Melting point 28.5° – 29.5°C.

3b. p,p'-di-n.butylazoxybenzene

A solution of 5.1 of p,p'-di-n.butylazobenzene in 350 ml of acetic acid was heated to 90°C. With vigorous stirring 70 ml of a 30% solution of hydrogen peroxide was added, 10 minutes afterwards another portion of 70 ml and 20 minutes afterwards a portion of 35 ml. After 70 minutes the mixture was poured in 3,500 ml of water and frozen. After melting the resulting product was filtered off at −5°C and recrystallized from ethanol-methanol (1:1).

Melting point 18°C

4. Mixture: p,p'-di-n.butylazoxybenzene, p,p'-di-n.pentyl-azoxybenzene, p-n.butyl-p'-n.pentylazoxybenzene, p-n.pentyl-p'-n.butylazoxybenzene The above mixture was obtained from 7.45 g of p-n.butylaniline and 8.15 g of p-n-pentylaniline by a method analogous to that described in Example 1. Melting point from −8°C to +2°C.

5. A glass plate of 60 × 65 × 2 mm (1 in FIGS. 1 and 2) provided with a pattern of indium oxide in the form of a figure 8 comprising seven segments 2 and a second glass plate of 50 × 60 × 1 mm 3 coated with a film of tin oxide 4 of thickness 0.1 μm were rubbed on their oxide-covered sides with a piece of lens tissue in one direction: plate 1 in the direction of its length, plate 3 in the transverse direction.

Two strips of polythene 5 of thickness 20 μm were laid on plate 1, after which plate 3 was laid on the strips. The layers were joined to one another by means of an epoxy adhesive 6 with the formation of filling apertures 7. The space between the glass plates was filled with p.p'-di-n-butylazoxybenzene. The apertures 7 were then closed with the adhesive.

Current supply leads were connected to indium-oxide terminal pads 8 and to the part of plate 3 projecting beyond plate 1. To the lower surface of plate 1 and to the upper surface of plate 3 planepolarization screens 9 were applied so that their directions of polarization were parallel to one another and to the rubbing direction of the plate 1. The resulting display when viewed through showed a dark image field.

The dibutylazoxybenzene molecules lie at the surfaces of the plates 1 and 3 in a direction parallel to the surfaces and to the direction of rubbing. Because these directions are at right angles to one another, the liquid crystalline compound has a twisted nematic structure.

An alternating voltage of 6 volts, 50 Hz, was set up across the glass plate 3 and the segments 2 on the plate 1. As a result a transparent image in the form of a figure 8 was produced.

As the area of the segments the molecules are oriented at right angles to the electrode surfaces, so that at this area the display becomes transparent.

What is claimed is:

1. A member selected from the group consisting of a compound of the formula

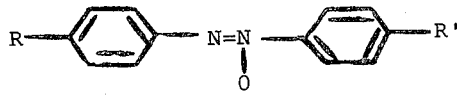

where R and R' each represent a normal alkyl group containing from 4 to 10 carbon atoms and mixtures thereof.

2. A compound of the formula

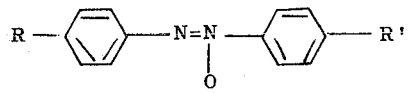

where R and R' each represent a normal=alkylgroup containing from 4 to 10 carbon atoms.

3. The 4,4'-di-n.butylazoxybenzene of claim 2.
4. The 4,4'-di-n.pentylazoxybenzene of claim 2.
5. The 4,4'-di-n.hexylazoxybenzene of claim 2.
6. The 4,4'-di-n.heptylazoxybenzene of claim 2.
7. The 4,4'-di-n.octylazoxybenzene of claim 2.
8. The 4,4'-di-n.nonylazoxybenzene of claim 2.
9. The 4,4'-di-n.decylazoxybenzene of claim 2.

* * * * *